United States Patent [19]

Perlman et al.

[11] Patent Number: 6,033,736
[45] Date of Patent: Mar. 7, 2000

[54] AQUEOUS WAX EMULSION AS PAINT PRIMER AND PAINT REPAIR ADHESIVE

[75] Inventors: Daniel Perlman, Arlington, Mass.; Robert Black, New Rochelle, N.Y.

[73] Assignee: Brandeis University, Waltham, Mass.

[21] Appl. No.: 09/106,931

[22] Filed: Jun. 29, 1998

[51] Int. Cl.$^7$ ........................................ B05D 1/38
[52] U.S. Cl. ...................... 427/384; 427/416; 106/14.34; 106/14.41
[58] Field of Search ................................... 427/416, 384; 106/14.34, 14.41

[56] References Cited

U.S. PATENT DOCUMENTS

| | | | |
|---|---|---|---|
| 4,046,934 | 9/1977 | Gustafson | 428/155 |
| 4,315,957 | 2/1982 | Hereth et al. | 427/155 |
| 4,323,602 | 4/1982 | Parker | 427/298 |
| 4,349,586 | 9/1982 | Sejournant | 427/154 |
| 4,594,109 | 6/1986 | Kawabata | 106/271 |
| 5,049,186 | 9/1991 | Kawabata | 106/2 |
| 5,387,434 | 2/1995 | Black | 427/154 |
| 5,773,091 | 6/1998 | Perlman et al. | 427/384 |

FOREIGN PATENT DOCUMENTS 53-019359  2/1978  Japan .

OTHER PUBLICATIONS

Kirk–Othmer, *Encyclopedia of Chemical Technology* 3$^{rd}$ Ed. vol. 24:466–481, 1984.

*Primary Examiner*—Erma Cameron
*Attorney, Agent, or Firm*—Lyon & Lyon LLP

[57] ABSTRACT

A method of improving the adhesion and durability of both new paint coatings, and older cracked or peeling paint coatings on an architectural surface is described. An aqueous wax emulsion (AWE) which, upon drying, forms an aqueous wax emulsion coating (AWEC), is adherent to an architectural surface as well as to new and older paint coatings. The AWEC is furthermore waterproof, and is hyper-permeable to water vapor, thereby preventing moisture-related bubbling and peeling of the new and older paint coatings.

28 Claims, No Drawings

AQUEOUS WAX EMULSION AS PAINT PRIMER AND PAINT REPAIR ADHESIVE

BACKGROUND OF THE INVENTION

This invention relates to the field of paint coatings, especially paint coating on architectural surfaces, and the application, preservation, and removal of such paint coatings.

The references cited in this description are not admitted to be prior art to the present invention, but are provided solely to assist the understanding of the reader.

Black in U.S. Pat. No. 5,387,434 described the application of an easily removable aqueous wax emulsion onto architectural surfaces to protect these surfaces against damage by graffiti paint and ink. The wax coating of Black is waterproof, and it is intended to function as a temporary protective coating, being conveniently removed together with any graffiti markings, using pressurized hot water.

Similarly, Hereth et al. in U.S. Pat. No. 4,315,957 describe the use of aqueous emulsions of hydrocarbon wax or other wax, mixed with an alkaline agent and an emulsifier to form a temporary protective wax coating on a metal or lacquered surface, in which the coating is easily removable with steam/hot water.

Similarly, Kawabata in U.S. Pat. Nos. 4,594,109 and 5,049,186 describes water-based wax emulsions which can be applied onto a painted or otherwise coated surface of a product to provide temporary protection for the coated surface until the product is sold.

Gustafson in U.S. Pat. No. 4,046,934 describes the use of a wax emulsion as a hydrophobic substance applied over a "crackled", i.e., cracked and discontinuous, paint surface on a fibrous building material to aid in shedding water from the surface of the building material. The wax emulsion produces a discontinuous, but water-resistant wax coating on the outer surface of a "crackled" water-base paint. The discontinuous wax coating results from the wax particles being negatively charged "so as to repel each other and to be oriented in mutual spaced relationship . . . and form therebetween interstices or cracks 5 through which vapour may pass", as shown in FIG. 2, items 4 and 5 of the patent. The wax emulsion is preferably applied while the water-based paint is still wet following paint application.

Sejournant in U.S. Pat. No. 4,349,586 describes application of a microcrystalline wax and a silicone oil dissolved in an organic solvent, after an initial application of a water-borne vegetable-based or microcrystalline wax, to protect walls and other surfaces against bill-posting, penetration by graffiti, and adherence of polluting agents.

In U.S. Pat. No. 5,773,091, Perlman and Black describe the addition of UV-protective agents and antioxidants to the wax component of aqueous wax emulsions to provide more durable and long-lasting protective wax coatings for resisting not only graffiti, but also environmental soiling in general.

The use of some outdoor preservative coatings and waterproofing liquid treatments which may contain wax for unpainted wood has been described. For example, Parker in U.S. Pat. No. 4,323,602 describes a water repellent wood preservative, in which a water-borne paraffin wax emulsion is combined with a fungicide. Another wood preservative known as Zar Clear Wood Sealer, is manufactured by the United Gilsonite Laboratories (Scranton, Pa.). It also incorporates a wax constituent, and is intended for use on exterior unpainted and unstained wooden surfaces.

The combining of wax coatings and paint coatings is usually considered undesirable. Directions for applying most exterior and interior paint products instruct the user to remove all traces of oil and wax from a surface before painting. Similarly, addition of a wax coating to an existing painted surface would be expected to interfere with subsequent painting or restoration of the architectural surface. In fact, the use of an aqueous wax emulsion as an anti-graffiti coating by Black in U.S. Pat. No. 5,387,434, and by Perlman and Black in U.S. Pat. No. 5,773,091, is intended to prevent unwanted graffiti paint from permanently adhering to a painted or unpainted surface.

SUMMARY OF THE INVENTION

This invention relates to the use of an aqueous wax emulsion (hereinafter abbreviated AWE), to produce upon drying, an aqueous wax emulsion coating (hereinafter abbreviated AWEC) which can be used as a primer coating under new paint coatings, and instilled into and under older cracked and partially lifting oil (alkyd) and water-based paint coatings to extend the lifetime of the paint coatings. With water-based paint, the AWE can even be combined within the paint as a water-repellent additive.

Accordingly, this invention relates to the use of AWEs to form paintable, waterproof AWECs, which are also water vapor hyper-permeable. By forming adherent (non-peeling), paintable, and compliant coatings on almost all kinds of architectural surfaces, the AWEC is ideal as an undercoating (paint primer). By also adhering to dried oil and water-borne paints, it is ideal as an overcoating to protect paint, to reattach any lifting and peeling paint to an underlying surface. A painted surface which has been overcoated by the wax emulsion coating can also be conveniently repainted. Therefore, the wax emulsion can be placed beneath, between and above coatings of paint.

Thus, in a first aspect, the invention includes a method of improving the adhesion and durability of both new paint coatings, and older paint coatings which may include areas of cracked or peeling paint on either a painted or unpainted architectural surface. The method involves utilizing an aqueous wax emulsion (AWE) liquid which upon drying, forms a solid aqueous wax emulsion coating (AWEC) which is adherent to the underlying architectural surface, and also adherent to both new and older paint coatings. Furthermore, the AWEC is waterproof and is hyper-permeable to water vapor, thereby preventing moisture-related bubbling and peeling of both new and older paint coatings. The method includes the steps of:

(i) providing an AWE which contains between approximately 2% and 50% by weight of at least one water-dispersible microparticulate wax whose melting point is between 50° C. and 100° C., at least one emulsifier, in which the emulsifier concentration is at least sufficient to stabilize the AWE against separation into a water phase and a wax phase, but is less than that concentration which would render the dried AWEC re-dispersible in water, and thus not waterproof, and approximately 40% to 98% by weight water;

(ii) applying the AWE to at least a portion of the painted or unpainted architectural surface, where the presence of an older cracked or peeling paint coating on the architectural surface benefits from penetration of the AWE through or under the cracked or peeling paint surface, and (iii) allowing the AWE to fully dry before applying any paint overcoating.

Usually the total emulsifier concentration ranges between 1% and 20% by weight of the total microparticulate wax concentration.

Note that on either an unpainted surface or an intact painted surface (such as an alkyd paint surface being primed to receive a water-based paint (see Example 6 below), the AWE is applied directly to either the architectural surface or to the paint.

Preferably the dried AWEC forms a continuous coating on the surface, preferably at least 2 particle layers in thickness, more preferably at least 3, 4, or 5 layers, still more preferably at least 8, 10, 12, 15, or 20 layers in thickness.

For the purposes of this invention, an "AWE" is defined as a wax-containing water-based emulsion in which microscopic solid wax particles are suspended in an aqueous liquid which contains a concentration of at least one emulsifying agent which is sufficient to provide emulsion stability (i.e., the emulsion does not separate into its component parts upon standing), but is less than that concentration which would render the dried AWEC re-dispersible in water and therefore not waterproof. The dried AWEC preferably contains greater than 50% by weight wax, and typically contains greater than 80% by weight wax.

The term "wax" includes the plant waxes, e.g., carnuba wax; the animal waxes, e.g., beeswax; the mineral waxes, e.g., paraffin and microcrystalline waxes; and the synthetic waxes, e.g., Fischer-Tropsch waxes. Preferably, the wax has a melting point in excess of 50° C. or 60° C., and preferably in excess of 70° C. or 80° C., more preferably in excess of 85° C., and most preferably in excess of 90° C. or even 100° C.

In the context of the present invention, the term "water vapor hyper-permeable" refers to a cohesive coating comprising one or more waxes (defined above), in which the coating has a microscopically particulate structure, and transmits water vapor at least 30%, and preferably 50% more rapidly (at room temperature and 30% relative humidity) than a coating of identical composition having a microscopically smooth and uninterrupted physical structure, i.e., at 1000× magnification, appearing "continuous", as if deposited and solidified from a melted wax.

In the context of this invention, the term "emulsion" refers to a wax emulsion, which is a suspension of a wax in an aqueous carrier. Typically the wax component is emulsified in liquid form at elevated temperature, but solidifies at room temperature to form a suspension of wax solids in water.

The term "emulsifier" refers to a compound or mixture of compounds which are surface-active compounds which stabilize a suspension of immiscible liquids. Generally emulsifiers act either by coating internal phase droplets to prevent coalescing and/or alter the surface tension at the interface of the suspended droplets. A large variety of different emulsifiers are known to those skilled in the art, along with parameters for selecting emulsifiers for particular formulations. In the present invention, emulsifiers generally remain active to stabilize the suspension of solid wax particles in a wax emulsion.

The term "architectural surface" refers to a surface constructed of a material commonly used for the construction of man-made objects and structures, such as, for example, buildings, signs, walls, fences, walls, ships, and monuments. Thus, such materials include, but are not limited to, wood, stone, masonry, concrete, plaster, metal, gypsum wallboard, and stucco surfaces. As described herein, the surface may be painted or unpainted, or may be partially or completely coated with another coating so long as an AWEC is able to adhere to that coating.

The term "water-dispersible" means that a component can be stably distributed in an aqueous medium, for example, in an aqueous solution, suspension, or emulsion. With respect to the AWEs of the present invention, for example, the AWE can be incorporated in a stable emulsion using, as needed, at least one emulsifier which stabilizes the emulsion.

In connection with an AWEC, the term "re-dispersible" means that the wax particles in the AWEC will re-suspend or re-distribute in water in contact with the AWEC surface without mechanical abrasion. Thus, if an AWEC is not re-dispersible, it means that the wax particles will not spontaneously resuspend in such water. This does not imply that zero wax particles will resuspend in the water, but rather that the AWEC layer will remain intact after continuous water contact of at least one day, preferably of at least one week, more preferably at least one month, and most preferably at least one year.

In connection with the wax particles used in AWEs in this invention, the term "microparticulate" indicates that the wax is in particulate form, with the mean diameter of the particles being of generally microscopic size. Generally, the mean particle diameter is between 0.1 $\mu$m and 10 $\mu$m, preferably between 0.5 $\mu$m and 5 $\mu$m, more preferably between 0.8 $\mu$m and 3 $\mu$m, and most preferably between 1 $\mu$m and 3 $\mu$m.

By "comprising" is meant including, but not limited to, whatever follows the word "comprising". Thus, use of the term "comprising" indicates that the listed elements are required or mandatory, but that other elements are optional and may or may not be present. By "consisting of" is meant including, and limited to, whatever follows the phrase "consisting of". Thus, the phrase "consisting of" indicates that the listed elements are required or mandatory, and that no other elements may be present. By "consisting essentially of" is meant including any elements listed after the phrase, and limited to other elements that do not interfere with or contribute to the activity or action specified in the disclosure for the listed elements. Thus, the phrase "consisting essentially of" indicates that the listed elements are required or mandatory, but that other elements are optional and may or may not be present depending upon whether or not they affect the activity or action of the listed elements.

From the description in Perlman and Black, U.S. Pat. No. 5,773,091, hereby incorporated by reference in its entirety, the wax component is preferably selected from the group consisting of mineral waxes (e.g., hydrocarbon waxes such as microcrystalline and paraffin waxes) and synthetic waxes. The durability, resistance to soiling, and extended water-repellency is improved by including in the wax portion of the AWE (termed "coating material" in U.S. Pat. No. 5,773,091) an effective concentration of at least one wax-protective chemical agent selected from the group consisting of photostable wax-soluble/water insoluble solar UV light absorbers, wax-soluble/water-insoluble free-radical and peroxy-radical scavengers, and wax-soluble/water-insoluble antioxidants. Preferably, the wax portion of the AWE includes at least three wax-protective chemical agents including a photostable wax-soluble/water insoluble solar UV light absorber, a wax-soluble/water-insoluble free-radical and peroxy-radical scavenger, and a wax-soluble/water-insoluble antioxidant. Within these three categories of wax-protective chemical agents, various preferred classes of agents, and many preferred examples of these agents are provided in U.S. Pat. No. 5,773,091. For example, free radical scavengers include the hindered amines and aminoethers, and the UV light absorbers include derivatized benzotriazoles and derivatized benzophenones. The meanings of terms referring to the various wax protective compounds are provided in U.S. Pat. No. 5,773,091 as reference above.

Preferred embodiments of the present invention include useful AWE compositions described in Black, U.S. Pat. No. 5,387,434. Also preferred embodiments utilize improved AWECs (termed "barrier coats") which contain UV protectants and antioxidants as described in U.S. Pat. No. 5,773,091. A typical AWE useful in embodiments of the present invention is manufactured by Hercules, Inc. (Industrial Specialties, Wilmington, Del. and is known as "Microlube C". This AWE contains 48% by weight solids, and is based upon microcrystalline mineral wax having a melting point of approximately 180° F. which has been emulsified to an average particle size of approximately one micron, and stabilized using a proprietary synthetic non-ionic emulsifier system containing, for example, polyoxyethylene ethers known to those skilled in the art. As described in U.S. Pat. No. 5,773,091, prior to emulsification, UV-protectants and an antioxidant (e.g., Tinuvin 328®, Tinuvin 292® and Irganox 1076® from the Ciba-Geigy Corp, Hawthorne, N.Y.) are added to the molten microcrystalline wax in selected amounts.

In preferred embodiments of this invention, the AWEC serves as a paint primer for new paint coatings. Preferably the applying step is accomplished by direct application of the AWE to the architectural surface, which may be either painted or unpainted, using a process selected from the group consisting of brushing, spraying and roller application. The AWE is allowed to fully dry before applying the paint coating.

In preferred embodiments, the AWEC serves as a repair adhesive agent, repair sealer agent, and restoration coating for older cracked and peeling paint coatings. Preferably the appying step is accomplished by application of the AWE to the surface of older paint coatings using a process selected from the group consisting of brushing, spraying and roller application. With older cracked and peeling paint, the AWE penetrates inward through cracks in an older paint coating, or under the peeling or lifting layer of paint to adhere the paint to the architectural surface.

In preferred embodiments, the new and older paint coatings which can be adhered to the architectural surface with the AWE are selected from the group consisting of oil-based and water-based paint coatings. Preferably the oil or water-based paint coatings include at least one resin selected from the group consisting of acrylic, latex, urethane and alkyd resins. The terms "oil-based", "water-based", "acrylic", "latex", "urethane" and "alkyd" resins have the meanings as understood in the paint coatings industry.

In preferred embodiments, the microparticulate wax used to manufacture the AWE includes at least one wax selected from the group consisting of mineral waxes and synthetic waxes. Preferably, the mineral wax is selected from the group consisting of microcrystalline, semimicrocrystalline, and paraffin-type hydrocarbon waxes. Most preferably, the microparticulate wax includes at least one microcrystalline hydrocarbon wax. The synthetic wax is selected from the group consisting of polyethylene, Fischer-Tropsch, and chemically modified hydrocarbon waxes. Preferably, the chemically modified hydrocarbon wax is selected from the group consisting of oxidized microcrystalline and oxidized paraffin waxes.

The meanings of these terms concerning the types of waxes are known to those skilled in the art, and are provided, for example, in standard textbooks and references. For example, brief desriptions are provided in KIRK-OTHMER: CONCISE ENCYCLOPEDIA OF CHEMICAL TECHNOLOGY, John Wiley and Sons, 1985, pp. 1259–1260. Longer descriptions are provided in KIRK-OTHMER: ENCYCLOPEDIA OF CHEMICAL TECHNOLOGY, $3^{rd}$ ed., Vol. 24, John Wiley & Sons, pp. 466–481.

Preferably, the AWE contains between 2% and 50% by weight microparticulate, preferably between 5% and 50%, still more preferably between 10% and 40%, and most preferably between 10% and 25% by weight microparticulate wax. Also preferably, the melting point of the wax in the AWEC is between 65° C. and 90° C., or is at least a temperature as indicated above.

In preferred embodiments, the emulsifier is selected from the group consisting of non-ionic, cationic and anionic emulsifiers. Preferably, the non-ionic emulsifier is selected from the group consisting of polyoxyethylene alkyl ethers, polyoxyethylene alkylphenyl ethers, polyoxyethylene fatty acid esters, and polyoxyethylenesorbitan fatty acid esters.

In preferred embodiments, the total emulsifier concentration is between 5% and 15% by weight of the total microparticulate wax concentration in the AWE, more preferably, the total emulsifier concentration is between 8% and 12% by weight of the total microparticulate wax concentration in the AWE.

In preferred embodiments of the invention, the durability and extended water-repellency of the AWEC is improved by including in the wax portion of the AWE an effective concentration of at least one wax-protective chemical agent selected from the group consisting of photostable wax-soluble/water insoluble solar UV light absorbers, wax-soluble/water-insoluble free-radical and peroxy-radical scavengers, and wax-soluble/water-insoluble antioxidants. Preferably, the wax portion of the AWE includes at least three wax-protective chemical agents including a photostable wax-soluble/water insoluble solar UV light absorber, a wax-soluble/water-insoluble free-radical and peroxy-radical scavenger, and a wax-soluble/water-insoluble antioxidant. Within these three categories of wax-protective chemical agents, various preferred classes of agents, and many preferred examples of these agents are provided in U.S. Pat. No. 5,773,091. Preferably, the free radical and peroxy-radical scavengers include the hindered amines and aminoethers. Preferably, the solar UV light absorbers include the derivatized benzotriazoles and derivatized benzophenones. Reference to "solar UV light absorbers" indicates that the absorbing compound appreciably absorbs light in the wavelengths of UV light which reach the surface of the Earth from the sun, generally light wavelengths in the range of 300 to 400 nanometers, especially around 325–350 nm.

The methods described above not only improve the adhesion and durability of paint coatings, but also permit the subsequent convenient removal of the paint. For applications where an AWEC, as described above, has been used as a primer coating, one can strip away an old paint coating or an undesirable color of paint (which can subsequently be replaced with a new paint coat) using pressurized hot water. Thus, if an AWEC is used as a primer, then the coating of paint above the primer can be easily removed using pressurized hot water to melt the primer coating of wax, carrying away the old paint. Compared with the current method of removing regular paint from the outside of a house by paint scraping, paint sanding and chemical paint stripping, the present invention, i.e., using a heated pressurized water spray to strip paint from a house is revolutionary. This new water-based method of paint removal is labor saving, cost-saving, protects the worker against potential inhalation of paint dust, and protects the environment against pollution by paint dust and pollution by caustic and toxic solvents used as paint strippers. Applicants have demonstrated that, in practice, paint stripping with the presently described pressurized hot water system (e.g., using water at a temperature of approximately 165–195° F. and a pressure of at least 250 psi) can remove paint from a microcrystalline wax-based AWEC primer coating applied on a wooden clapboard house at least 10-fold more rapidly than the conventional paint removing methods described above.

Accordingly, in another aspect of this invention, a method is provided for removing a protective coating of paint from a man-made object or structure. The surface of the structure includes a paint coating which was applied over an AWEC. The AWEC was formed by applying an AWE as a primer coating to the surface of the structure (as described above) before the paint was applied. The coating of paint is removed from the man-made structure using pressurized hot water to soften or melt the AWEC primer, thereby removing the paint. Preferably the AWEC is also removed prior to application of a new paint coat, preferably also by using pressurized hot water, preferably at the same time as the paint overcoating is removed. Before recoating with paint, a new AWEC primer coat or other suitable primer will be applied and allowed to dry.

In preferred embodiments, the coat of paint which can be removed is selected from the group consisting of oil-based and water-based paints and stains, waterproof varnishes, preservative coatings and other clearcoat finishes, and antifouling paints applied to boat bottoms and to other water-submerged surfaces susceptible to bio-fouling.

Also in preferred embodiments, the AWEC is as described for aspects and embodiments above.

Other features and advantages of the present invention will be apparent from the following description of the preferred embodiments and from the claims.

DETAILED DESCRIPTION OF THE PREFERRED EMBODIMENTS

As described in the Summary above, the present invention concerns the use of AWECs in paint coating methods, specifically use as a primer coat under a new paint coating, and use as a paint coating restorative when applied over old paint coatings.

The invention relates to several new and interrelated observations, namely:

(i) the discovery of unexpectedly rapid transport of water vapor through an AWEC, essentially independent of its coating thickness. As is shown below, the rate of water vapor transport through the AWEC is almost two-fold greater than through the same wax coating which has been melted into a smooth, transparent non-emulsive, or non-particulate, coating. This so-called "hyperpermeability" property of the dried AWEC allows moisture to escape from an architectural material (such as the outside structural material of a building). Otherwise, moisture which is trapped under the surface, can cause bubbling in a water-impermeable coating, e.g., a water sealant-type paint coating applied to the architectural material.

(ii) the surprising ability of oil and water-based paints to permanently adhere to these beaded wax coatings used as "paint primers". Such adhesion is surprising because it contrasts with the failure of most if not all paints, such as acrylic latexes to adhere to smooth wax finishes applied in organic solvents.

(iii) the ability of AWEs to infiltrate cracked and peeling paint coatings, and re-adhere the paint to the underlying architectural surface.

In this invention, the water vapor hyper-permeability property of AWECs is useful in allowing moisture to escape through the wax-repaired cracks in the coating. By using AWEs containing suitable UV protectants as described by Perlman and Black in U.S. Pat. No. 5,773,091, the rejuvenated and repaired painted surface can effectively resist sunlight and rain over an extended period of time, e.g., several years. If, in addition to the repair treatment, a newly painted top surface is desired, the new paint can be applied directly over the AWEC-repaired old paint.

To better understand the properties of AWECs as used in the present invention, the commercially prepared AWE described in the Summary above was diluted with water to a final concentration of 15% by weight solids, applied to a microscope slide, and examined using high power (approximately 1000× magnification) phase contrast light microscopy. Photomicrographs printed at a final magnification of 5,000× were analyzed. At this magnification, a very rough surface was apparent consisting of closely packed, somewhat irregular spheres whose diameters measured between approximately 5 mm and 9 mm. This measurement divided by 5,000 is consistent with the 1.5 micron diameter average particle size reported to Applicant by Hercules, Inc. The visual examination of photomicrographs definitively confirmed that AWE microparticles remain morphologically discrete in the dried AWEC, yet are sufficiently self-adherent to form a substantially tough and scuff-resistant waterproof coating. Subsequently, the above microscope slide, carrying the dried AWEC, was briefly heated (3–5 seconds) to a temperature of approximately 210° F. (a temperature above the melting point of the microcrystalline wax). The slide was cooled to room temperature and the coating was re-examined and again photomicrographed. Not surprisingly, the discrete wax spheres were absent, replaced by an optically clear, somewhat puckered surface indicative of wax which had melted and re-solidified.

The surprising characteristics of the AWEC (now understood to consist of closely packed wax microspheres) is the extent to which these coatings tenaciously hold paints, are physically resilient, and are surprisingly permeable to water vapor (while still remaining waterproof). Without water vapor permeability, a coating will hold humidity in the architectural substrate material and cause undesirable paint bubbling and structural damage. For example, in chronically moist wood, dry rot usually occurs, and in brick and other masonry, spalling and ice-associated damage can occur under the paint. The waterproof, vapor-hyper-permeable properties of the presently described AWEC suggest its use as both a paint primer and an overcoating for protecting newly painted surfaces, and repairing and protecting old painted surfaces. In overcoatings applied to old paint, the AWECs show surprising adhesive and cohesive properties after drying. These properties allow the wax (which infiltrates a cracked and peeling painted surface) to glue old and peeling paint to the underlying architectural surface, e.g., wooden trim, clapboard and shingles on a house. Improvements to the stability of wax compositions described in U.S. Pat. No. 5,773,091, based upon the use of wax-soluble, water-insoluble UV protectants and antioxidants are especially important for assuring the longevity of overcoatings applied to both new or old painted surfaces.

This invention is especially useful when applied to dimensionally unstable surfaces (flexible or expanding and contracting surfaces), as the AWEC resists cracking and peeling. Applied to old and cracked paint, the AWEC provides adhesive, waterproof repair of the paint. Yet the AWE which infiltrates through cracks, and dries beneath the cracked and/or peeling paint, produces an AWEC which becomes water vapor hyper-permeable.

The examples below demonstrate certain of the advantageous properties and characteristics of the described AWECs and their use in the methods of this invention.

EXAMPLE 1
Non-Linear Water Vapor Transmission Through AWECs

In the course of conducting research for U.S. Pat. No. 5,773,091, the AWE described above (Microlube C, Hercules Inc.) which had been modified with UV protectants, and previously sold commercially as an anti-graffiti coating known as G PRO® (BAT Inc., New Rochelle, N.Y.) was applied to a variety of architectural materials including wood and concret masonry blocks. Even when such blocks were moist, and heavily coated on all surfaces with the AWE described above (approximately 200–300 square feet per gallon coverage using an AWE containing 15% by weight microcrystalline wax), the resulting dried coatings allowed these blocks to lose moisture rapidly upon exposure to wind and sun.

To better understand the properties of AWECs, a moisture transmission measurement system for coatings was developed by Applicants. This system consists of a set of small, identical polystyrene plastic Petri dishes (52 mm inside diameter; 21.2 cm surface area, Nalge Nunc International, Naperville, Ill.) covered with 0.0010 inch thick (1.0 mil) regenerated cellulose dialysis membrane (manufactured by the Union Carbide Corp., Chicago, Ill.). The dialysis membrane was pre-moistened with water and cut to form 6.5 cm discs. Each membrane disc, while slightly moist, was pulled tightly and formed over the lip of the petri dish, and sealed in place by wrapping an adhesive polyethylene tape around the outside wall of the dish, capturing the outer edge of the membrane. Then, precisely weighed amounts of G PRO® AWE were applied to duplicate membrane surfaces and dried, producing duplicate dry wax coatings ranging from 7 microns to 40 microns in thickness (between approximately 4 and 25 wax bead diameters thick, with 1.5 micron beads). For the commercial G PRO® liquid (containing 15% by weight microcrystalline wax), these dry coating thicknesses are obtained using liquid coverages ranging from 900 ft$^2$/gal to 150 ft$^2$/gal. For purposes of reference, a typically recommended and effective anti-graffiti coating is obtained with a 300 ft$^2$/gal coverage rate, i.e., the dried coating is approximately 20 microns thick.

Once the wax coatings had dried, 8 milliliters of distilled water was injected through a melted hole (made by hot syringe needle) in the sidewall of each Petri dish. After the holes were sealed the Petri dish samples were all weighed, including two dishes sealed with dialysis membranes lacking wax coatings as controls. Over a period of six hours, the samples, incubated at room temperature (20° C.), were weighed each hour. The amounts of water loss (termed "water evap", in grams per 21.2 cm$^2$ of membrane area) for the duplicate coatings were averaged and tabulated, and were compared to the control samples without any wax. The decreased rate of water evaporation (water blocking) for each coating was calculated by subtracting each relative % evaporation rate from 100% (the rate for the uncoated control, see Table 1). After these measurements were made, a number of the covered Petri dish samples were briefly exposed to an elevated temperature in a warming oven (110° C. for one minute) to melt and fuse the wax microparticles in the coatings. These samples were again followed for rates of water evaporation over a six hour period, and the numbers are provided in parentheses ( ) in Table 1.

TABLE 1

| A. Coating (microliter/cm$^2$) | B. Coating Coverage (ft$^2$/gal) | C. Coating Thickness (microns) | D. Water Evap. (grams) | E. Water Evap. (Relative Rate %) | F. Water Blocking % |
|---|---|---|---|---|---|
| 1. zero (control) | — | — | 0.597 | 100 (100) | — |
| 2. 4.5 | 900 | 7 | 0.312 | 52 | 48 |
| 3. 6.8 | 600 | 10 | 0.282 | 47 | 53 |
| 4. 9.1 | 450 | 15 | 0.281 | 47 (27) | 53 |
| 5. 13.6 | 300 | 20 | 0.260 | 44 (26) | 56 |
| 6. 20.4 | 200 | 30 | 0.220 | 37 (24) | 63 |
| 7. 27.2 | 150 | 40 | 0.209 | 35 (17) | 65 |

Results and Discussion

All of the AWECs applied to the membrane show relatively high rates of water vapor transmission (35%–52%) compared to the uncoated membrane (control). Once these microparticulate coatings are melted and fused, their rates of water vapor transmission decrease to about 50%–60% of their original rates (cf. 27% vs. 47% in line 1, and 17% vs. 35% in line 7). These tests conclusively prove that a microparticulate wax coating is more water vapor-permeable than a continuous wax coating of identical composition (formed by melting the original microparticulate coating). Continuous wax coatings (which may be applied as a hot-melt or from an organic solvent vehicle which evaporates to leave the wax coating) are smoother, more optically transparent, and can sometimes be made more scuff-resistant. Such continuous coatings are often preferred for use in polishes.

However, in the present invention, the water vapor permeability of an AWEC is advantageous. In addition, the non-linearity in the rate of water vapor transmission as a function of the thickness of the AWEC is important, surprising, and technically valuable. As a result of this non-linearity (see Table 1, column E.), the water vapor transmission rate is maintained almost constant (only a 33% decrease rather than a 600% decrease as the wax coating thickness is increased almost 6-fold (from approximately 7 microns to 40 microns). That is, in column E, the rate of water vapor transmission decreases from 52% to 35% of the control rate, and 52%–35%/52% equals a 33% decrease. This 7–40 micron range of wax coating thickness spans most if not all of the useful range for the present invention. Given that the average wax bead diameter in this G PRO® AWE preparation was 1.5 microns, the number of beads required to span these coatings ranged from approximately five to twenty-five.

EXAMPLE 2
Water Vapor Transmission Through Wax Paper

As a control experiment for Example 1, a water vapor transmission experiment was carried out using the same protocol described in Example 1, except that instead of using AWE-coated dialysis membranes, commercial food grade wax paper was substituted on the Petri dishes (see Table 2). The purpose of this comparison was to determine how the moisture transmission rates through the AWEC compositions of Example 1 compared with the well known conventional wax coating found in wax paper. The wax paper (Cut-Rite® brand, manufactured by Reynolds Metals Company, Richmond, Va.) consisted of a paraffin wax-continuously melt-coated paper which varied in thickness between 0.0011 and 0.0012 inches (1.1 and 1.2 mils). Duplicate Petri dishes were covered and sealed with either one layer or two layers of the wax paper (samples designated "wax 1L and wax 2L" respectively in Table 2). The rates of water vapor transmission through these wax papers (measured by water weight loss) were compared with three different "control" membranes over Petri dishes. The first control was the uncoated cellulose dialysis membrane (designated "dialysis"), and was identical to the "zero (control)" in Example 1. The second and third controls were extruded linear polyethylene membrane (designated "Polyethylene"), 0.0007 inches thick, i.e., 0.7 mils, and vinylidene polymer membrane (designated "saran") 0.0004 inches thick, i.e., 0.4 mils. Water rate loss data represents the average of duplicate Petri dish samples incubated for 23 hours at 23° C. (see Table 2).

TABLE 2

| A. Petri Covering Material | B. Membr. Thickness | | C. Water Evaporation | D. Water Evaporation |
|---|---|---|---|---|
| | (mils) | (microns) | (grams) | (Relative Rate %) |
| 1. dialysis | 1.0 | 25 | 2.42 | 100.0 |
| 2. wax 1L | 1.15 | 29 | 0.653 | 27.0 |
| 3. wax 2L | 2.3 | 58 | 0.309 | 12.8 |
| 4. Polyethylene | 0.7 | 18 | 0.012 | 0.50 |
| 5. Saran | 0.4 | 10 | 0.007 | 0.29 |

Results and Discussion

In Example 1, melting and fusion of the AWEC coatings caused a substantial decrease in the water vapor transmission rate. For example, in the case of the 30 micron thick wax coating in Table 1, water transmission decreased from 37% of the control rate (before fusion) to 24% of the control rate (after fusion), while the 40 micron wax coating showed a rate decrease from 35% (before fusion) to 17% (after fusion). Wax paper can be considered a continuous (or fused) wax coating. Thus, the data in Table 2 for the wax paper can be compared to the "after fusion" results (in parentheses) in Table 1. Comparing the 29 micron single layer wax paper (Table 2, line 2.) to the 30 micron fused AWEC (Table 1, column E line 6.), the relative rates of water vapor transmission are very similar (27% and 24% respectively). Not surprisingly, the addition of a second layer of wax paper caused a proportional, i.e., 2-fold, decrease in the water vapor transmission rate, from 27% to approximately 13% of the control. Interestingly, the relatively high rates of water vapor loss through wax paper show how relatively permeable mineral waxes are to water vapor, compared to conventional thermoplastics such as polyethylene and saran. The anticipated and confirmed linear decrease in water vapor transmission, with increasing wax paper thickness, underscores the surprising nature of the results in Example 1, Table 1. That is, with the intact unmelted AWECs which consist of packed microparticles of mineral wax, a disproportionately high and almost constant rate of water vapor transmission is maintained, even as the thickness of these coatings is increased from 10 microns to 40 microns or more.

EXAMPLE 3

AWEC as a Paint Primer Coating
Paints Adhere to an AWEC But Not to a Solvent-Applied Wax Coating While conducting background research for U.S. Pat. No. 5,773,091, it was found that alkyd-based graffiti paint which, by chance, had not been removed from an AWE-treated surface, could persist on the AWEC for several years without peeling or fading. For example, graffiti paint markings which are at least four years old have been found and are in excellent condition, having survived outdoors and in the sun and rain (graffiti spray-paint on an anti-graffiti AWEC based upon Microlube C, Hercules Inc.). Realizing that the AWEC was itself waterproof, tenacious to most surfaces, resistant to both peeling and embrittlement, and highly permeable to water vapor, Applicants investigated whether the AWEC might be suitable for use as a paint primer. Subsequently, experimental testing showed that both oil- and water-based paints could be permanently adhered to these AWECs. Paint adhesion persisted in cold and hot environments, during extended solar UV exposure, during continuous, as well as alternating exposure to soaking and drying conditions, and during salt water exposure.

The observation of long term adhesion of paint to the AWEC was surprising because it contrasted with the expectation that paints would not adhere to wax coatings. In fact, this expectation was confirmed by dissolving paraffin and microcrystalline petroleum waxes in chloroform, then applying these separate solutions by brush to a wooden surface. Following solvent evaporation, the two wax coatings were painted with alkyd and acrylic latex paints. It was difficult to obtain a uniform paint coating on either wax because the wet paints beaded up on the wax surfaces rather than wetting them. After drying, both paint coatings could be easily wiped away from the solvent-applied wax coatings. By comparison, it is believed that the microscopically porous beaded surface of an AWEC allows a paint to firmly anchor itself to the wax. Such anchoring is not possible on a smooth, solvent-applied wax surface.

Besides the obvious chemical difference, there are interesting physical differences between an AWEC primer and a traditional alkyd or latex-type paint primer. Traditional primers tend to be strongly adherent to architectural substrates, and somewhat elastic so that the primer can expand and contract along with the architectural surface. Still, at least two problems can arise. As the primer ages, it tends to become less elastic and more prone to cracking and separating from an expanding and contracting architectural surface. If the primer coat fails, the finish coat of paint will also fail. Insofar as the AWEC primer is strongly adherent to substrates and receptive to paint top-coatings, it is somewhat like the traditional primer. However, the AWEC primer is unlike the traditional primer because it contains a myriad of void spaces (between the myriad of wax microparticles). The void spaces, i.e., nooks and crannies, not only allow anchoring of a top coat of paint, but also facilitate microscopic expansion and contraction of the wax coating to occur (with wax particles moving over one another within the coating). It is hypothesized that this wax particle movement within the coating serves to relieve stress. This movement, in turn, reduces the shearing force at the interface between the primer and the expanding and contracting architectural material. This is particularly important if cracking and peeling of the primer is to be avoided.

To determine if and how the concentration of wax in the AWE (and the resulting AWEC thickness) would affect the quality of subsequently applied oil and water-based paint coatings, two successive aqueous dilutions of the AWE used in Example 1 (15% by weight microcrystalline wax) were made, in which the wax concentration was decreased by one-half in each successive dilution (15%, 7.5% and 3.8% by weight wax). One coat of these three different AWE dilutions was then applied by urethane foam brush to three different substrate materials: porous wall plaster, red cedar clapboard wood, and a sheet-metal surface. After the AWECs were thoroughly dry, three different paint coatings: red latex gloss enamel, red alkyd gloss enamel (both Krylon® brand, Sherwin-Williams Company, Solon, Ohio), and a brown linseed oil-based outdoor stain finish (Olympic Solid Color Stain, PPG Architectural Finishes, Inc. Pittsburgh, Pa.) were applied to the nine different surfaces (3 wax coating densities on each of 3 different substrates).

After the paints were thoroughly dried and aged for one week at room temperature, the water-repellency and the resistance of the paints to mechanical removal (by fingernail abrasion) were examined. Results were as follows. The three finishes (two paints and one stain) adhered to all of the wax coatings on all of the substrates. All of the finishes were water-repellent and all of the finishes were resistant to peeling when submerged in water for at least one week. However, on the porous surfaces (wood and plaster) the best water-repellency was observed with the highest concentration of wax. Water repellency diminished continuously as the wax concentration in the AWE decreased. The most pronounced effect was evident in the abrasion test. Given the softness of the microcrystalline wax, the highest concentration of wax (15%) produced the most abrasion-susceptible paint coatings, and the lowest concentration of wax (3.8%) produced the most abrasion-resistant paint coatings. On an absorbent wood or plaster surface, the 15% wax content AWE appeared to be workable, although the paint top coat was somewhat abrasion-susceptible. On the other hand, the 7.5% wax content primer coating yielded a more scratch-resistant paint top coat (for all three paint types tested). However, on a non-porous surface (sheet metal), a paint top coating on top of even the 7.5% microcrystalline wax content primer, was very susceptible to scratching and abrasion. Therefore, the ideal wax concentration in the AWE must be determined, based upon the physical properties of the substrate being coated (e.g., its porosity and absorbency), and the required hardness and scratch resistance/abrasion resistance of the top coat of paint.

An additional parameter which can be varied is the hardness of the wax itself which is used in the manufacture of the AWE. A harder AWEC produces a more abrasion-resistant paint top coat. Intermediate hardnesses can be created by blending hard and softer waxes. Thus, for example, a hard synthetic wax having a suitable melting point (less than 200° F.), can be blended with a softer microcrystalline wax to produce a wax of intermediate hardness. If the wax composition is altered, the new wax emulsion is tested for maintaining stability, and upon drying, the coalesced AWEC is tested for retaining its waterproof property. The amount of emulsifier and its composition (often a balanced blended composition) can be adjusted to sustain these essential properties.

EXAMPLE 4

AWEC for Repair of Old Paint Coatings

Cracked and Peeling Paints are Re-adhered to Architectural Surfaces

It was recognized that an AWEC was waterproof, resistant to both peeling and embrittlement, highly permeable to water vapor, and adherent to essentially all dried paints (both water- and alkyd-based paints), and to architectural surfaces. Despite the dogma in painting protocols that wax and paint coatings should not be intermingled, Applicants believed that if an AWEC could function as a paint primer, then it might also be useful for re-adhering and repairing cracked and peeling paint. Tests have now shown that cracked and peeling oil and water-based paints can be re-adhered to the underlying architectural surface. The old paint is overcoated with an AWE, preferably containing a high concentration of wax (e.g., 15–50% by weight microcrystalline wax), so that paint cracks can be substantially filled with AWE solids. The AWE infiltrates paint cracks and reaches the underside of lifting and partially detached paint areas. The AWE is brushed into the paint cracks, and/or applied in a heavy "soak-coating" so that the AWE can penetrate by capillary action, and fill cracks and any spaces under the lifting paint. As the AWE dries, it cements down and embeds these areas of weakened paint.

In one test, an extensively cracked and partially lifting, eight year old linseed oil-based outdoor stain (Olympic Solid Color Stain, PPG Architectural Finishes, Inc. Pittsburgh, Pa.) present on dry and porous fir window frames (approximately 100 year old wood) was treated with the AWE used in Example 1 (15% by weight microcrystalline wax). Following drying, some of the AWE-treated areas were left "as is", while some areas were over-painted with the same linseed oil-based Olympic stain. After two full years on a southeast-facing wall in New England, including summer heat, winter cold, and rains, the AWE-treated, and the over-painted-AWE-treated surfaces both appear essentially newly repaired. That is, paint cracks remain filled with wax, and the over-paint (stain) remains firmly attached to the underlying microporous wax repair coating (the AWEC).

EXAMPLE 5

AWEC as Primer for Boat Bottoms Having Copper Oxide-Based Bottom Paint and for Repair of Such Paint It was recognized that an AWEC is waterproof, resistant to both peeling and embrittlement, and adheres to essentially all dried paints (both alkyd and waterborne) on essentially any architectural surface. The underwater surfaces of boats, docks, and other structures which are maintained in fresh or salt water are painted with specialized bottom paints that contain copper oxide. The function of the copper oxide is to prevent or discourage residence by animal and vegetable species, e.g., barnacles, snails, seaweed, algae, and the like. The highly toxic copper oxide deteriorates after one season in an aqueous environment. When a boat is hauled, it is power-washed to remove plant growth and loose barnacles. The copper oxide coating is sanded to remove loose paint material, and the boat is repainted before returning to the water. The highly toxic copper oxide dust from sanding becomes airborne, and is a hazard to the environment as well as to workers who remove the deteriorated bottom paint and may breathe the dust.

The G PRO® AWE described above (containing approximately 15% by weight microcrystalline wax) was applied to the bottom of a power boat at a spread rate of 300 ft$^2$ per gallon. The resulting AWEC was allowed to dry for 24 hours. Alkyd-based Pettit brand "Trinadad Bottom Paint" was applied to the AWEC surface of the boat bottom according to the manufacturer's recommended application rate. The bottom paint was allowed to dry for 24 hours before the boat was launched into salt water. The boat was used regularly for two months, and operated at normal running speeds. After two months, the boat was hauled and inspected for paint failure and any other abnormalities. None were found. The boat bottom was then subjected to high temperature power washing (1,000 psi water pressure, 195° F.). The bottom paint was removed with some difficulty.

The above experiment was repeated using two coats of the G PRO® AWE so that the wax coating density on the boat bottom was effectively doubled (150 ft$^2$ coverage per gallon). This time when the boat was hauled after two months, the high temperature power washing removed all of the bottom paint quickly and easily. The bottom paint came off in large sheets, and these sheets of bottom paint could be swept up or vacuumed easily. No hazardous toxic bottom paint dust was produced in this process which produced only sheet waste material. As an additional benefit, applying the AWEC to the boat bottom served to adhere any loose flakes of pre-existing bottom paint to the boat hull before the new coating of bottom paint was applied.

EXAMPLE 6
AWEC as a Primer for Water-Based Paint Over Oil-Based Paint

Once an architectural surface has been painted with an oil-based paint, i.e., alkyd paint, a waterborne paint may adhere poorly to the alkyd surface. As a result of this incompatibility, it is recommended that an oil-based paint be removed before applying a new coat of water-based paint such as acrylic latex-type paint.

Two samples of gypsum wallboard were coated with a Glidden brand alkyd-based paint. These samples were allowed to dry for two days. A second coat of the same alkyd paint was applied to the samples and also allowed to dry for two days. One sample was painted over (without priming), using a Glidden brand water-based acrylic latex paint. The second sample was primed with one coat of G PRO® AWE at a spread rate of 300 ft$^2$ per gallon, allowed to dry for 24 hours, and then painted over with the same Glidden brand water-based acrylic latex paint. After the acrylic latex waterborne paint coating on each sample had dried at least two days, the two samples were compared. The acrylic latex paint adhered well to the surface of the AWE-primed sample but not to the unprimed surface. In fact, upon close inspection of the unprimed sample, the acrylic latex paint coating contained discontinuities in the coverage of the alkyd surface and was judged unsatisfactory.

All patents and publications mentioned in the specification are indicative of the levels of skill of those skilled in the art to which the invention pertains. All references cited in this disclosure are incorporated by reference to the same extent as if each reference had been incorporated by reference in its entirety individually. One skilled in the art would readily appreciate that the present invention is well adapted to carry out the objects and obtain the ends and advantages mentioned, as well as those inherent therein. The specific compounds and methods described herein as presently representative of preferred embodiments are exemplary and are not intended as limitations on the scope of the invention. Changes therein and other uses will occur to those skilled in the art which are encompassed within the spirit of the invention are defined by the scope of the claims.

It will be readily apparent to one skilled in the art that varying substitutions and modifications may be made to the invention disclosed herein without departing from the scope and spirit of the invention. For example, those skilled in the art will recognize that the invention may suitably be practiced using a variety of different wax or emulsifier compounds within the general descriptions provided.

The invention illustratively described herein suitably may be practiced in the absence of any element or elements, limitation or limitations which is not specifically disclosed herein. Thus, for example, in each instance herein any of the terms "comprising," "consisting essentially of" and "consisting of" may be replaced with either of the other two terms. The terms and expressions which have been employed are used as terms of description and not of limitation, and there is not intention that in the use of such terms and expressions of excluding any equivalents of the features shown and described or portions thereof, but it is recognized that various modifications are possible within the scope of the invention claimed. Thus, it should be understood that although the present invention has been specifically disclosed by preferred embodiments and optional features, modification and variation of the concepts herein disclosed may be resorted to by those skilled in the art, and that such modifications and variations are considered to be within the scope of this invention as defined by the appended claims.

In addition, where features or aspects of the invention are described in terms of Markush groups or other grouping of alternatives, those skilled in the art will recognize that the invention is also thereby described in terms of any individual member or subgroup of members of the Markush group or other group.

Thus, additional embodiments are within the scope of the invention and within the following claims.

What we claim is:

1. A method of improving the adhesion and durability of a paint coating, comprising the steps of:

applying an aqueous wax emulsion to at least a portion of an architectural surface, wherein said aqueous wax emulsion comprises between 2% and 50% by weight of at least one water-dispersible microparticulate wax whose melting point is between 50° C. and 100° C., at least one emulsifier, wherein the total concentration of said at least one emulsifier is at least sufficient to stabilize said aqueous wax emulsion but is less than that concentration which would render the dried aqueous wax emulsion coating re-dispersible in water, and between 40% and 98% by weight water, wherein said aqueous wax emulsion is applied beneath a paint overcoating and said aqueous wax emulsion is allowed to dry before applying said paint overcoating, or said paint coating is a deteriorated paint coating and said aqueous wax emulsion penetrates cracks and penetrates beneath peeling paint thereby sealing said cracks and re-adhering said peeling paint.

2. The method of claim 1, wherein said total emulsifier concentration is between 1% and 20% by weight of the total microparticulate wax concentration.

3. The method of claim 1, wherein said aqueous wax emulsion coating serves as a paint primer for a new paint coating.

4. The method of claim 3, wherein said surface is painted or unpainted and said aqueous wax emulsion is directly applied to said surface using a process selected from the group consisting of brushing, spraying and roller application.

5. The method of claim 1, wherein said aqueous wax emulsion coating serves as a repair adhesive agent, repair sealer agent, and restoration coating for cracked and peeling paint coatings.

6. The method of claim 5, wherein said applying step is accomplished by application of said aqueous wax emulsion to the surface of said paint coatings using a process selected from the group consisting of brushing, spraying and roller application, and said aqueous wax emulsion penetrates inward through cracks in said paint coatings to said architectural surface.

7. The method of claim 1, wherein said paint coating is selected from the group consisting of oil-based and water-based paint coatings.

8. The method of claim 4, wherein said paint coating comprises at least one resin selected from the group consisting of acrylic, latex, urethane and alkyd resins.

9. The method of claim 1, wherein said at least one microparticulate wax comprises at least one wax selected from the group consisting of mineral waxes and synthetic waxes.

10. The method of claim 1, wherein said at least one microparticulate wax comprises at least one mineral wax selected from the group consisting of microcrystalline, semimicrocrystalline, and paraffin hydrocarbon waxes.

11. The method of claim 1, wherein said at least one microparticulate wax comprises at least one microcrystalline hydrocarbon wax.

12. The method of claim 1, wherein said at least one microparticulate wax comprises at least one synthetic wax selected from the group consisting of polyethylene, Fischer-Tropsch, and chemically modified hydrocarbon waxes.

13. The method of claim 12, wherein said chemically modified hydrocarbon wax is selected from the group consisting of oxidized microcrystalline and oxidized paraffin waxes.

14. The method of claim 1, wherein said microparticulate wax contains at least one wax-protective chemical agent selected from the group consisting of photostable wax-soluble and water insoluble solar UV light absorbers, wax-soluble and water-insoluble free-radical and peroxy-radical scavengers, and wax-soluble and water-insoluble antioxidants.

15. The method of claim 1, wherein said microparticulate wax contains at least three wax-protective chemical agents, comprising a photostable wax-soluble and water insoluble solar UV light absorber, a wax-soluble and water-insoluble free-radical and peroxy-radical scavenger, and a wax-soluble and water-insoluble antioxidant.

16. The method of claim 1, wherein said microparticulate wax contains at least one wax-soluble and water insoluble free radical scavenger selected from the group consisting of hindered amines and aminoethers.

17. The method of claim 1, wherein said microparticulate wax contains at least one wax-soluble and water insoluble solar UV light absorber selected from the group consisting of derivatized benzotriazoles and derivatized benzophenones.

18. The method of claim 1, wherein said emulsifier is selected from the group consisting of non-ionic, cationic and anionic emulsifiers.

19. The method of claim 18, wherein said non-ionic emulsifier is selected from the group consisting of polyoxyethylene alkyl ethers, polyoxyethylene alkylphenyl ethers, polyoxyethylene fatty acid esters, and polyoxyethylenesorbitan fatty acid esters.

20. The method of claim 1, wherein said aqueous wax emulsion comprises between 10% and 25% by weight microparticulate wax.

21. The method of claim 1, wherein said total emulsifier concentration is between 5% and 15% by weight of said total microparticulate wax concentration in said aqueous wax emulsion.

22. The method of claim 1, wherein said total emulsifier concentration is between 8% and 12% by weight of said total microparticulate wax concentration in said aqueous wax emulsion.

23. The method of claim 1, wherein the melting point or points of the wax or waxes constituting at least 75% by weight of the wax component in said aqueous wax emulsion coating is between 65° C. and 90° C.

24. The method of claim 3, wherein said aqueous wax emulsion is applied over an oil-based paint coating and said new paint coating is a water-based paint.

25. The method of claim 1, wherein said aqueous wax emulsion coating is at least 5 particle layers in thickness.

26. The method of claim 1, wherein said architectural surface comprises a surface of a ship.

27. The method of claim 1, wherein said architectural surface comprises an underwater surface maintained in fresh or salt water.

28. The method of claim 27, wherein said underwater surface is coated with a bottom paint to inhibit plant and animal growth.

* * * * *